(12) United States Patent
Park et al.

(10) Patent No.: US 11,940,180 B2
(45) Date of Patent: Mar. 26, 2024

(54) HOT WATER SUPPLY TANK

(71) Applicant: LG ELECTRONICS INC., Seoul (KR)

(72) Inventors: Heewoong Park, Seoul (KR); Jeongseob Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 81 days.

(21) Appl. No.: 17/424,971

(22) PCT Filed: Jan. 22, 2020

(86) PCT No.: PCT/KR2020/001095
§ 371 (c)(1),
(2) Date: Jul. 22, 2021

(87) PCT Pub. No.: WO2020/153751
PCT Pub. Date: Jul. 30, 2020

(65) Prior Publication Data
US 2022/0090822 A1    Mar. 24, 2022

(30) Foreign Application Priority Data
Jan. 25, 2019    (KR) .......................... 10-2019-0009713

(51) Int. Cl.
*F24H 1/18*    (2022.01)
*B65D 88/74*    (2006.01)
(Continued)

(52) U.S. Cl.
CPC ........... *F24H 1/181* (2013.01); *B65D 88/748* (2013.01); *F24D 19/0092* (2013.01); *F24H 1/185* (2013.01); *F24H 4/04* (2013.01)

(58) Field of Classification Search
CPC .......... F24H 1/181; F24H 1/183; F24H 1/185; F24H 4/04; F24H 1/208; F24H 9/40;
(Continued)

(56) References Cited

U.S. PATENT DOCUMENTS

| 4,918,938 A   | * | 4/1990 | De Forest | ............... F25B 30/06 |
| | | | | 165/169 |
| 2010/0209084 A1 | * | 8/2010 | Nelson | ...................... F24H 4/04 |
| | | | | 62/238.7 |

(Continued)

FOREIGN PATENT DOCUMENTS

| DE | 1955411 A1 | * | 4/1969 |  |
| GB | 2070744 A  | * | 9/1981 | ............. F24H 1/182 |

(Continued)

OTHER PUBLICATIONS

What size hot water heater do you need, Jul. 14, 2017, The Plumbing Source https://plumbingsource.net/what-size-hot-water-heater-do-you-need/ (Year: 2017).*
(Continued)

*Primary Examiner* — Edelmira Bosques
*Assistant Examiner* — Michael James Giordano
(74) *Attorney, Agent, or Firm* — KED & ASSOCIATES, LLP

(57) ABSTRACT

Provided is a hot water supply tank including: a case forming an appearance of the hot water supply tank; a heating container accommodating a fluid and having an inner side treated with anticorrosive; a heater installed on an outer side of the heating container and transferring heat to the fluid; and a heat insulator interposed between the case and the heater, wherein in a predetermined volume of the heating container, a ratio at which a performance of the heater to transfer heat (hereinafter, heat transfer performance) is maximized (hereinafter, optimum ratio) among the ratios of side height to bottom diameter of the heating container (hereinafter, aspect ratios) is determined by whether the heater is installed on the bottom as well as side of the heating container, and determined based on an area of the heating container occupied by the heater (hereinafter, heat transfer area).

4 Claims, 10 Drawing Sheets

HEAT TRANSFER METHOD:
SIDE HEATING

SIDE AND
BOTTOM HEATING

(51) Int. Cl.
*F24D 19/00* (2006.01)
*F24H 4/04* (2006.01)

(58) Field of Classification Search
CPC .. F24H 9/455; F25B 2500/01; F25B 2500/09; F25B 2500/18; F25B 39/04; F28D 1/06; F24D 17/02
See application file for complete search history.

(56) References Cited

U.S. PATENT DOCUMENTS

| | | | | |
|---|---|---|---|---|
| 2011/0252820 | A1* | 10/2011 | Hockman | F25B 30/00 62/238.7 |
| 2013/0031923 | A1* | 2/2013 | DuPlessis | F28D 7/024 62/238.1 |
| 2014/0124051 | A1* | 5/2014 | Bewley, Jr. | F24H 4/04 137/334 |

FOREIGN PATENT DOCUMENTS

| | | |
|---|---|---|
| JP | 62-059337 | 3/1987 |
| JP | 10-000254 | 11/1998 |
| JP | 2017-029203 | 2/2017 |
| KR | 20-1991-0018350 | 11/1991 |
| KR | 10-2006-0121491 | 11/2006 |
| KR | 10-0757018 | 9/2007 |
| KR | 10-2009-0128125 | 12/2009 |
| KR | 10-2015-0044010 | 4/2015 |
| KR | 10-2016-0126625 | 11/2016 |

OTHER PUBLICATIONS

International Search Report dated May 15, 2020 issued in Application No. PCT/KR2020/001095.
Korean Office Action dated Jun. 15, 2023 issued in Application No. 10-2019-0009713.

* cited by examiner

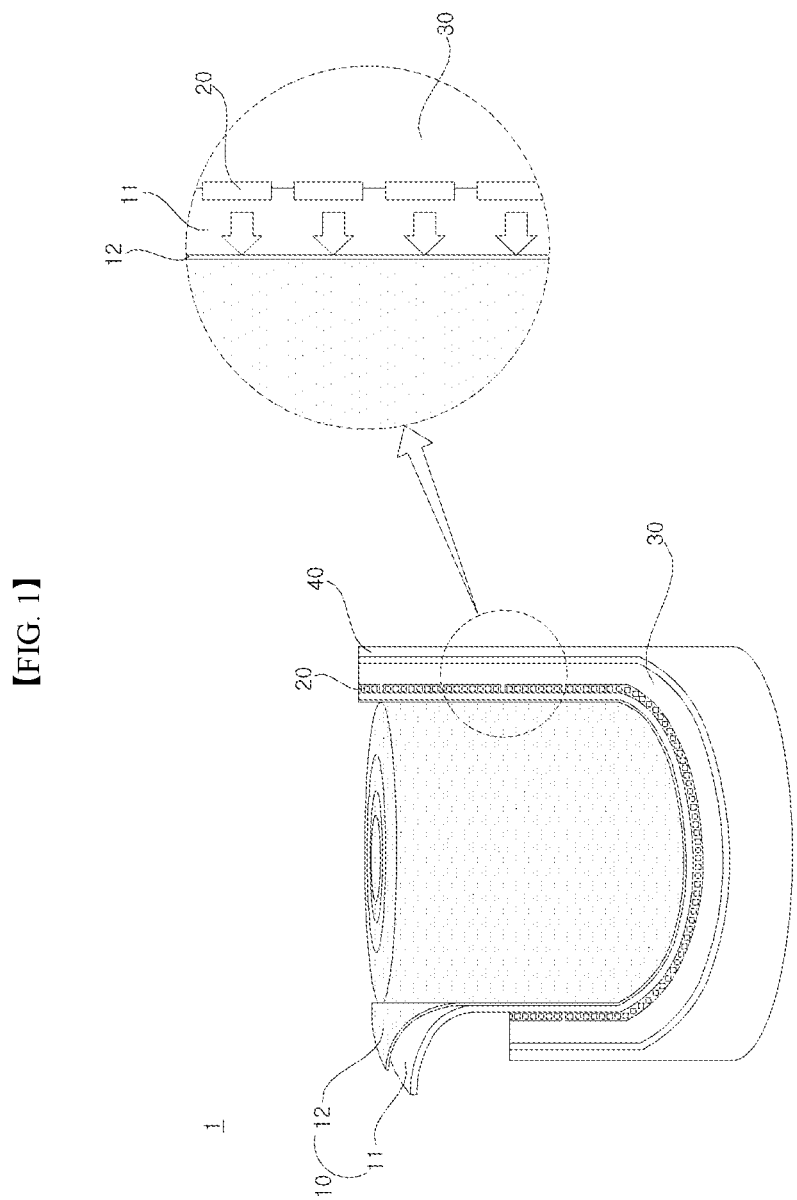

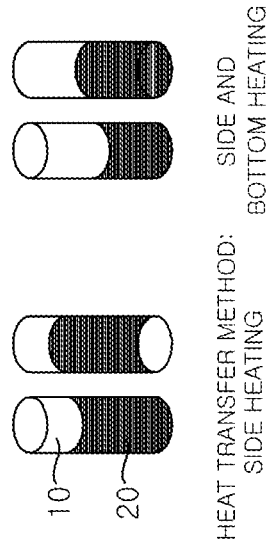
[FIG. 2A]
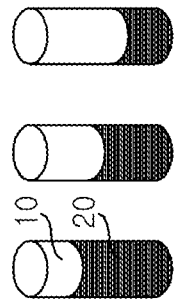
[FIG. 2B]
HEAT TRANSFER AREA:
$1.6m^2 > 1.2m^2 > 0.8m^2$
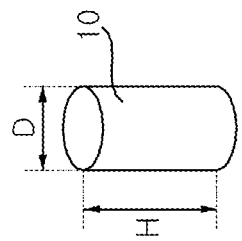
[FIG. 2C]
HEAT TRANSFER METHOD:
SIDE HEATING    SIDE AND BOTTOM HEATING

[FIG. 3A]
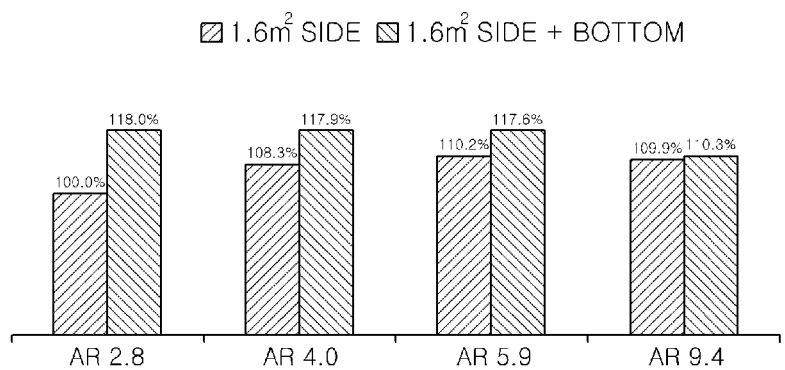
[FIG. 3B]
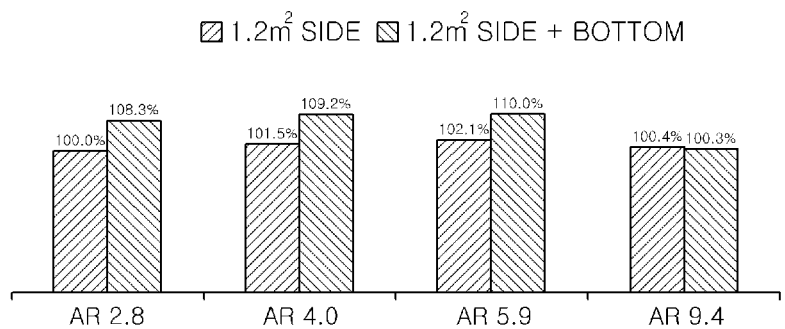
[FIG. 3C]
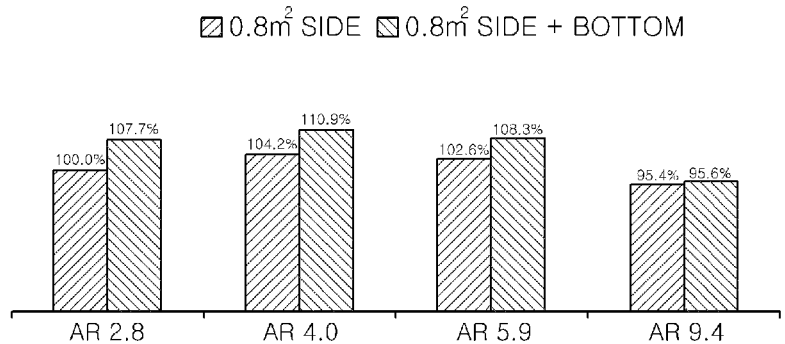

[FIG. 4A]
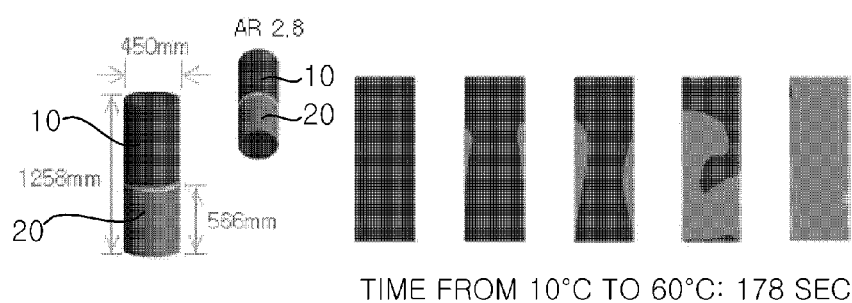
TIME FROM 10°C TO 60°C: 178 SEC
[FIG. 4B]
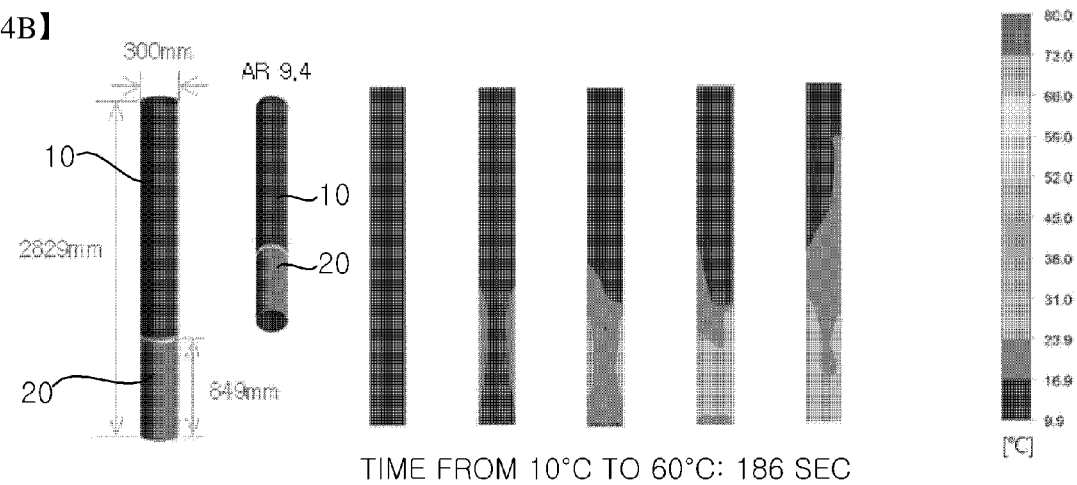
TIME FROM 10°C TO 60°C: 186 SEC

[FIG. 5A]
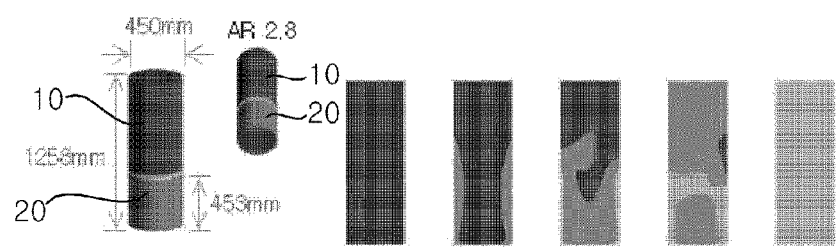
TIME FROM 10°C TO 60°C: 165 SEC
[FIG. 5B]
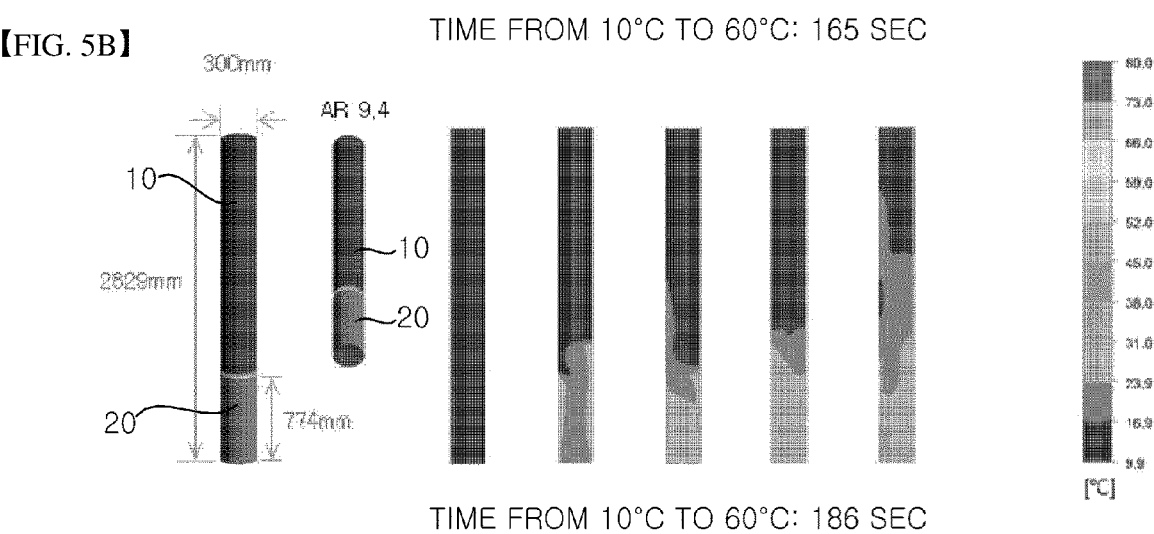
TIME FROM 10°C TO 60°C: 186 SEC

[FIG. 6A]
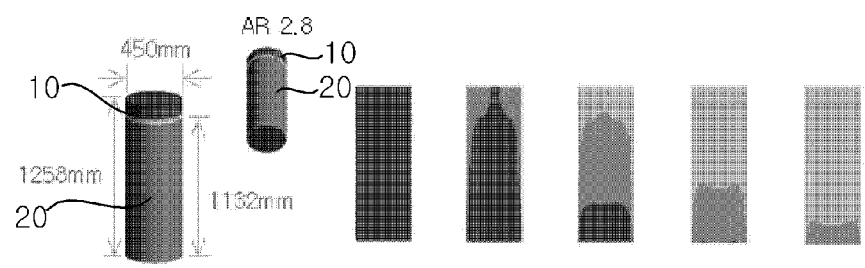
TIME FROM 10°C TO 60°C: 99 SEC
[FIG. 6B]
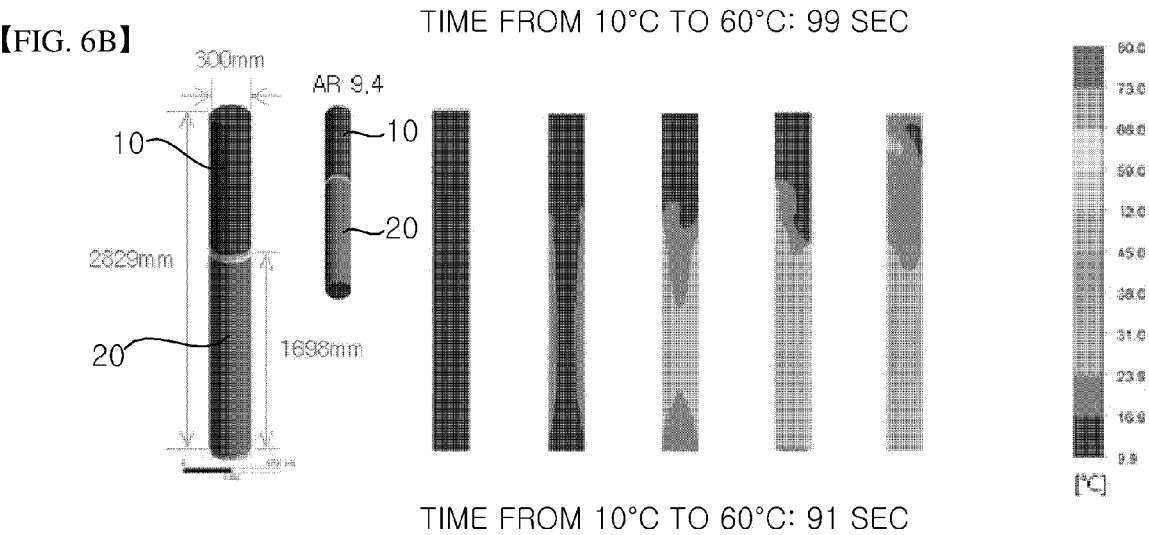
TIME FROM 10°C TO 60°C: 91 SEC

[FIG. 7A]
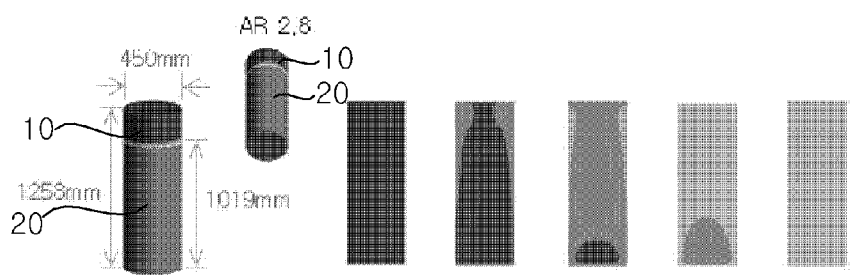
TIME FROM 10°C TO 60°C: 84 SEC
[FIG. 7B]
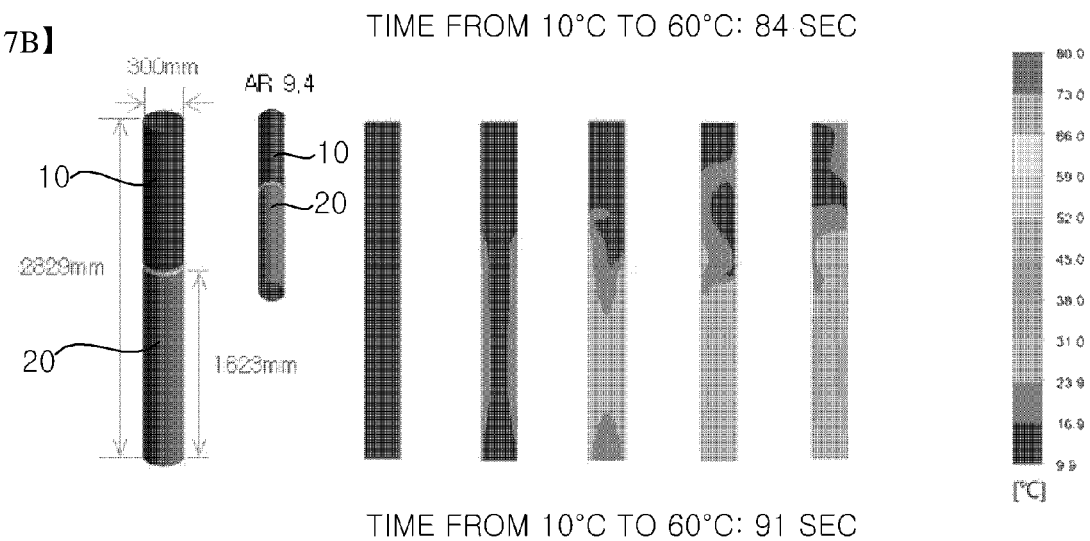
TIME FROM 10°C TO 60°C: 91 SEC

[FIG. 8]
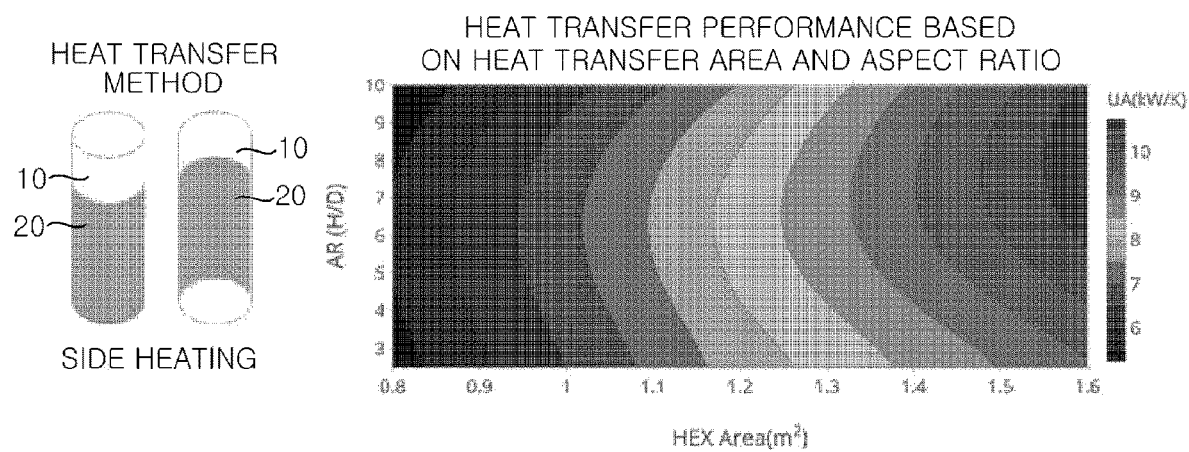

[FIG. 9]
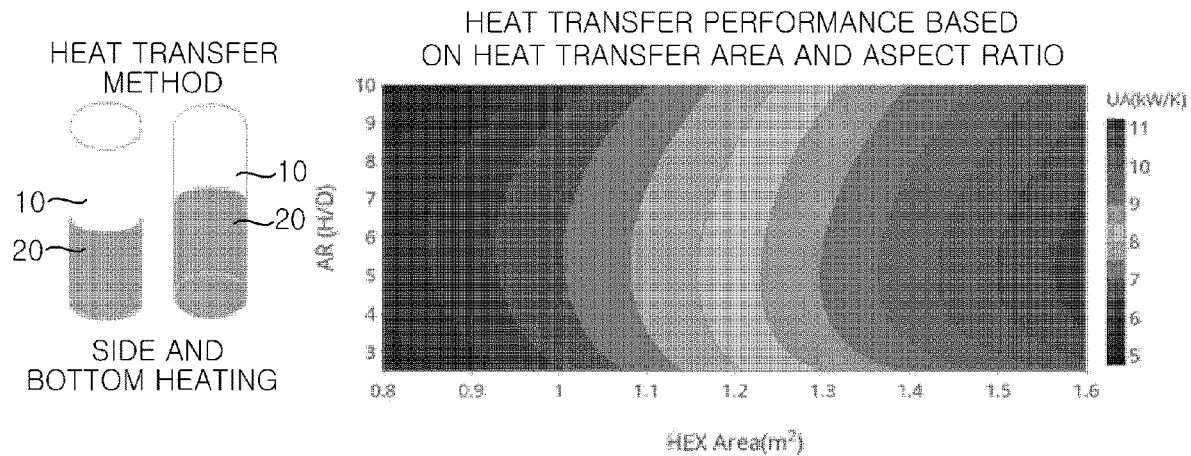

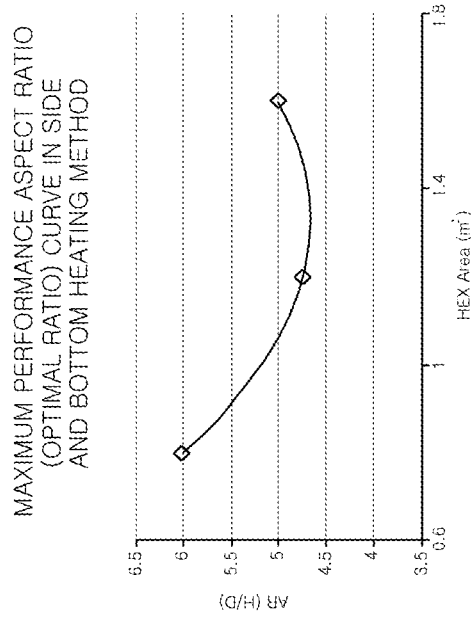
[FIG. 10A]
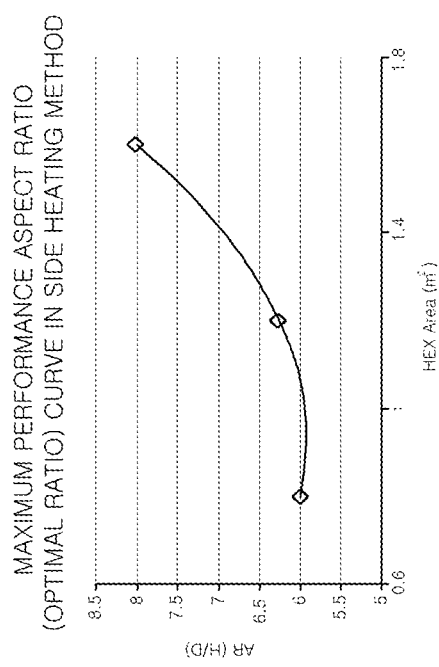
[FIG. 10B]

HOT WATER SUPPLY TANK

CROSS-REFERENCE TO RELATED PATENT APPLICATIONS

This application is a U.S. National Stage Application under 35 U.S.C. § 371 of PCT Application No. PCT/KR2020/001095, filed Jan. 22, 2020, which claims priority to Korean Patent Application No. 10-2019-0009713, filed Jan. 25, 2019, whose entire disclosures are hereby incorporated by reference.

TECHNICAL FIELD

The present disclosure relates to a hot water supply tank, and more particularly, to a hot water supply tank having an improved heat transfer performance by optimizing a shape of the hot water supply tank or an arrangement of its heater.

BACKGROUND ART

In general, a hot water supply tank refers to a device that heats water using a heater and provides a user with hot water. Here, if the heater of the hot water supply tank is installed on a wall of a container containing water, the hot water supply tank may also be referred to as a wall heating type hot water supply tank.

Conventionally, various technologies have been developed to improve a heat transfer performance of the hot water supply tank. However, there is insufficient development of technology for improving the heat transfer performance by optimizing a shape of the hot water supply tank or an arrangement of its heater.

In addition, there is no suggestion of a method for an optimal design of the hot water supply tank based on a relationship among the main factors of its heat transfer performance such as the shape of the hot water supply tank and the arrangement of the heater.

DISCLOSURE OF INVENTION

Technical Problem

The present disclosure provides a hot water supply tank having an improved heat transfer performance by optimizing a shape of the hot water supply tank or an arrangement of its heater.

The present disclosure also provides a hot water supply tank having an optimal design based on a relationship among the main factors of the heat transfer performance.

Technical tasks of the present disclosure are not limited to those mentioned above, and other tasks not mentioned here may be obviously understood by those skilled in the art from the following description.

Technical Solution

In an aspect, a hot water supply tank includes: a case forming an appearance of the hot water supply tank; a heating container accommodating a fluid and having an inner side treated with anticorrosive; a heater installed on an outer side of the heating container and transferring heat to the fluid; and a heat insulator interposed between the case and the heater, wherein in a predetermined volume of the heating container, a ratio at which a performance of the heater to transfer heat (hereinafter, heat transfer performance) is maximized (hereinafter, optimum ratio) among the ratios of side height to bottom diameter of the heating container (hereinafter, aspect ratios) is determined by whether the heater is installed on the bottom as well as side of the heating container, and determined based on an area of the heating container occupied by the heater (hereinafter, heat transfer area).

In the predetermined heat transfer area, the heat transfer performance corresponding to the optimum ratio may be higher when the heater is installed on the bottom as well as side of the heating container than when the heater is installed only on the side of the heating container.

The heat transfer performance corresponding to the optimum ratio may be higher as the heat transfer area increases.

The optimum ratio may have a value of 4 to 9 when the heat transfer area ranges from 0.6 to 1.8 $m^2$.

In a case where the volume of the heating container ranges from 180 to 220 L and the heater is installed only on the side of the heating container, the optimum ratio may have a value of 5.5 to 6.5 when the heat transfer area ranges from 0.8 to 1.2 $m^2$, and may have a value proportional to the heat transfer area when the heat transfer area is more than or equal to 1.2 $m^2$.

In a case where the volume of the heating container ranges from 180 to 220 L and the heater is installed on the bottom as well as side of the heating container, the optimum ratio may have a value of 4.5 to 5.5 when the heat transfer area ranges from 1.2 to 1.6 $m^2$, and may have a value inversely proportional to the heat transfer area when the heat transfer area is less than or equal to 1.2 $m^2$.

Any technical solution not mentioned above may be easily derived from the following description of exemplary embodiments of the present disclosure.

[Advantageous Effects]

The present disclosure may present one or more of the following effects.

First, among the aspect ratios of the heating container, the ratio that maximizes the heat transfer performance, i.e. the optimum ratio, may be determined based on the arrangement and area of the heater, and the heating container may thus be shaped to have a maximum heat transfer performance.

Second, the optimum ratio may be determined based on the predetermined volume of the heating container, and the arrangement and area of the heater, and the heating container may thus be shaped to have the maximum heat transfer performance.

DESCRIPTION OF DRAWINGS

FIG. 1 is a view showing a hot water supply tank according to an exemplary embodiment of the present disclosure.

FIGS. 2A to 2C are views showing a main factor determining a heat transfer performance of the hot water supply tank according to an exemplary embodiment of the present disclosure.

FIGS. 3A to 3C are graphs showing the heat transfer performance based on the heat transfer area and arrangement of a heater of the hot water supply tank according to an exemplary embodiment of the present disclosure.

FIGS. 4A and 4B are graphs showing the heat transfer performance based on an aspect ratio in a case of a side heating method and a heat transfer area of 0.8 $m^2$.

FIGS. 5A and 5B are graphs showing the heat transfer performance based on an aspect ratio in a case of a side and bottom heating method and the heat transfer area of 0.8 $m^2$.

FIGS. 6A and 6B are graphs showing the heat transfer performance based on an aspect ratio in a case of the side heating method and a heat transfer area of 1.6 m².

FIGS. 7A and 7B are graphs showing the heat transfer performance based on an aspect ratio in a case of the side and bottom heating method and the heat transfer area of 1.6 m².

FIG. 8 is a graph showing the heat transfer performance based on the heat transfer area and the aspect ratio in the case of the side heating method.

FIG. 9 is a graph showing the heat transfer performance based on the heat transfer area and the aspect ratio in the case of the side and bottom heating method.

FIGS. 10A and 10B are graphs showing an optimal ratio curve with respect to the heat transfer area.

MODE FOR CARRYING OUT THE INVENTION

Various advantages and features of the present disclosure and methods accomplishing them become apparent from the following detailed description of exemplary embodiments with reference to the accompanying drawings. However, the present disclosure is not limited to the exemplary embodiments described below, but may be implemented in various different forms, these exemplary embodiments are provided only to make the present disclosure complete and allow those skilled in the art to completely recognize the scope of the present disclosure, and the present disclosure is defined by the scope of the claims. Throughout the specification, the same reference numerals denote the same elements.

Hereinafter, a hot water supply tank according to the exemplary embodiments of the present disclosure is described with reference to FIG. 1.

FIG. 1 is a view showing a hot water supply tank according to an exemplary embodiment of the present disclosure.

As shown in FIG. 1, a hot water supply tank 1 according to an exemplary embodiment of the present disclosure includes a heating container 10, a heater 20, a heat insulator 30 and a case 40.

The heating container 10 may accommodate a fluid such as water, and may have an inner side treated with anticorrosive. The inner side of the heating container 10 may be treated with anticorrosive, and it is thus possible to prevent rust from occurring on its surface.

The heating container 10 may include a body 11 made of a material having high thermal conductivity (e.g., stainless steel) and an anticorrosive material 12 such as enamel attached to an inner surface of the body 11.

The specification describes that the heating container 10 has a cylindrical shape. However, the heating container 10 of the present disclosure is not limited the cylindrical shape, and other shapes may also be applied thereto.

The heater 20 may be installed on an outer side of the heating container 10. The heater 20 may be attached to an outer surface of the body 11.

The heater 20 may transfer heat energy to the fluid accommodated in the heating container 10. That is, the heater 20 may transfer the heat energy to the fluid, and the fluid may thus be heated.

The heater 20 may be a heat exchanger in which a refrigerant flows. Here, the following description briefly describes that the heat energy is transferred from the refrigerant to the fluid.

The refrigerant discharged from a compressor at high temperature and high pressure may release heat from a condenser to an ambient air, may then pass through an expansion valve and be discharged at low temperature and low pressure, may then absorb heat from an ambient air in an evaporator and be evaporated to a gaseous state, and may flow back into the compressor to complete a cycle. In this case, the refrigerant may transfer the heat energy to the fluid accommodated in the heating container 10, and the fluid may thus be heated.

Meanwhile, according to an exemplary embodiment of the present disclosure, the heater 20 may be an electric heater that generates heat when a current flows. The present disclosure does not specifically limit a type of the heater 20.

As shown in FIG. 1, the heat insulator 30 may be interposed between the heater 20 and the case 40 described below. The heat insulator 30 may prevent heat generated by the heater 20 from being discharged to the outside of the hot water supply tank 1 through the case 40.

That is, the heat insulator 30 may enable the heat generated by the heater 20 to be easily discharged to the heating container 10, and it is thus possible to increase a rate of heat energy transfer of the heater 20 to the fluid and reduce heat loss to the outside.

As shown in FIG. 1, the case 40 may form an appearance of the hot water supply tank 1. The case 40 may accommodate the above-described components, i.e., the heating container 10, the heater 20 and the heat insulator 30.

The case 40 may have a cylindrical shape, and is not limited thereto.

The case 40 may be made of a material having low thermal conductivity, thereby preventing the heat generated by the heater 20 from being emitted to the outside of the case 40, and allowing a surface of the case 40 to have a relatively low temperature. This manner may be advantageous to prevent thermal damage to elements disposed in the periphery of the hot water supply tank 1.

The present disclosure provides a method for improving a performance of the heater 20 to transfer heat (also referred to as a heat transfer performance) to the fluid by optimizing the shape of the heating container 10 or the arrangement or area of the heater 20.

Hereinafter, the description describes a configuration of the hot water supply tank according to the exemplary embodiments of the present disclosure for improving its heat transfer performance in detail with reference to FIGS. 1 through 10.

FIG. 2 is a view showing a main factor determining a heat transfer performance of the hot water supply tank according to an exemplary embodiment of the present disclosure; and FIG. 3 is a graph showing the heat transfer performance based on the heat transfer area and arrangement of a heater of the hot water supply tank according to an exemplary embodiment of the present disclosure.

FIG. 4 is a graph showing the heat transfer performance based on an aspect ratio in a case of a side heating method and a heat transfer area of 0.8 m²; FIG. 5 is a graph showing the heat transfer performance based on an aspect ratio in a case of a side and bottom heating method and the heat transfer area of 0.8 m²; FIG. 6 is a graph showing the heat transfer performance based on an aspect ratio in a case of the side heating method and a heat transfer area of 1.6 m²; and FIG. 7 is a graph showing the heat transfer performance based on an aspect ratio in a case of the side and bottom heating method and the heat transfer area of 1.6 m².

FIG. 8 is a graph showing the heat transfer performance based on the heat transfer area and the aspect ratio in the case of the side heating method; FIG. 9 is a graph showing the heat transfer performance based on the heat transfer area and the aspect ratio in the case of the side and bottom heating method; and FIG. 10 is a graph showing an optimal ratio curve with respect to the heat transfer area.

As shown in FIG. 2, the present disclosure presents the followings as three main factors determining the heat transfer performance: (i) the ratio of side height H to bottom diameter D of the heating container 10 (hereinafter, H/D or aspect ratio AR); (ii) an area of the heating container 10 occupied by the heater 20 (hereinafter, heat transfer area); and (iii) whether the heater 20 is installed on the bottom as well as side of the heating container 10 (i.e., heat transfer method).

That is, in a predetermined volume of the heating container 10, a ratio at which the heat transfer performance is maximized (hereinafter, optimum ratio) among the aspect ratios ARs may be determined by whether the heater 20 is installed on the bottom as well as side of the heating container, and determined based on the heat transfer area.

To explain this point in more detail, actual experiments are performed on a total of 24 cases under the following conditions: the aspect ratio AR shown in (a) of FIG. 2 corresponds to any one of 2.8, 4.0, 5.9 or 9.4; the heat transfer area shown in (b) of FIG. 2 corresponds to any one of 1.6 $m^2$, 1.2 $m^2$ or 0.8 $m^2$; and the heat transfer method shown in (c) of FIG. 2 corresponds to either one of the side heating method and the side and bottom heating method. At least some of these results are shown in FIGS. 3 to 10.

The heat transfer performance as a criterion for comparing the superiority in each case of the above experiments may be the performance to transfer heat, that is proportional to the inverse of time taken for a temperature of water accommodated in the heating container 10 to be changed from 10° C. to 60° C. when a volume of the heating container is 200 L and a surface temperature of the heater 20 is maintained at 80° C.

(a) of FIG. 3 shows the heat transfer performance when the heat transfer area is 1.6 $m^2$. It may be taken as a criterion that the heat transfer performance is 100% when the heat transfer method uses the side heating method and the aspect ratio AR is 2.8. Here, it may be seen that the heat transfer performance is higher when the heat transfer method uses the side and bottom heating method than when using the side heating method regardless of whether the aspect ratio AR corresponds to any one of 2.8, 4.0, 5.9 or 9.4.

(b) of FIG. 3 shows the heat transfer performance when the heat transfer area is 1.2 $m^2$. It may be taken as a criterion that the heat transfer performance is 100% when the heat transfer method uses the side heating method and the aspect ratio AR is 2.8. Here, it may be seen that the heat transfer performance is higher when the heat transfer method uses the side and bottom heating method than when using the side heating method regardless of whether the aspect ratio AR corresponds to any one of 2.8, 4.0, 5.9 or 9.4 (However, an exception may be made when the aspect ratio AR is 9.4).

(c) of FIG. 3 shows the heat transfer performance when the heat transfer area is 0.8 $m^2$. It may be taken as a criterion that the heat transfer performance is 100% when the heat transfer method uses the side heating method and the aspect ratio AR is 2.8. Here, it may be seen that the heat transfer performance is higher when the heat transfer method uses the side and bottom heating method than when using the side heating method regardless of whether the aspect ratio AR is 2.8, 4.0, 5.9 or 9.4.

That is, in the predetermined heat transfer area, the heat transfer performance corresponding to the predetermined aspect ratio AR may be higher when the heater 20 is installed on the bottom as well as side of the heating container 10 (i.e., when the heat transfer method uses the side and bottom heating method) than when the heater 20 is installed only on the side of the heating container 10 (i.e., when the heat transfer method uses the side heating method).

The optimum ratio may be included in the aspect ratio AR. Therefore, in the predetermined heat transfer area, the heat transfer performance corresponding to the optimum ratio may be higher when the heater 20 is installed on the bottom as well as side of the heating container 10 (i.e., when the heat transfer method uses the side and bottom heating method) than when the heater 20 is installed only on the side of the heating container 10 (i.e., when the heat transfer method uses the side heating method).

This point may also be seen in the graphs shown in FIGS. 8 and 9. In FIGS. 8 and 9, UA (kW/K) stands for the heat transfer performance, HEX Area ($m^2$) stands for the heat transfer area, and AR (H/D) stands for the aspect ratio AR.

FIGS. 8 and 9 each show the heat transfer performance based on the heat transfer area and the aspect ratio AR, and it may be seen that the optimum ratio at which the heat transfer performance is maximized in the predetermined heat transfer area is determined by any one value.

In the predetermined heat transfer area, the heat transfer performance corresponding to the optimum ratio may be higher when the heat transfer method uses the side and bottom heating method as shown in FIG. 9 than when the heat transfer method uses the side heating method as shown in FIG. 8.

Meanwhile, as shown in FIGS. 8 and 9, the heat transfer performance corresponding to the optimum ratio may be higher as the heat transfer area increases.

The description above describes that it is advantageous to improve the heat transfer performance to install the heater 20 on the bottom as well as side of the heating container 10. However, as the heater 20 is installed on the bottom as well as side of the heating container 10, its manufacturing process may become complicated and the installation cost may increase.

The description above describes that the increasing heat transfer area is advantageous to improve the heat transfer performance. However, as the heat transfer area increases, its manufacturing process becomes complicated and the installation cost may increase.

Accordingly, a user or a designer may determine the heat transfer method and a heat transfer area size in consideration of the cost-to-benefit ratio. In this case, it is preferable to determine the optimum ratio, which is the ratio at which the heat transfer performance is maximized among the aspect ratios ARs based on the heat transfer method and the heat transfer area size.

FIGS. 4 to 7 are experimental results each showing difference in the heat transfer performance based on the aspect ratio AR in the predetermined heat transfer method and heat transfer area size, and show how water heated by the heater 20 spreads in the heating container 10 over time.

(a) of FIG. 4 shows a case where the volume of the heating container 10 is 200 L, the heat transfer method uses the side heating method, and the heat transfer area is 0.8 $m^2$. If the aspect ratio AR is 2.8 (i.e. the diameter D is 450 mm and the height H is 1,258 mm), water heated by the heater 20 installed on a lower side of the heating container 10 spreads evenly to the center and upper portions of the heating container 10, and time taken for water in the heating container 10 to reach from 10° C. to 60° C. is measured to be 178 seconds.

Meanwhile, (b) of FIG. 4 shows a case where the volume of the heating container 10 is 200 L, the heat transfer method uses the side heating method, and the heat transfer area is 0.8 m². If the aspect ratio AR is 9.4 (i.e. the diameter D is 300 mm and the height H is 2,829 mm), water heated by the heater 20 installed on the lower side of the heating container 10 spreads relatively slowly to the center and upper portions of the heating container 10, and the time taken for water in the heating container 10 to reach from 10° C. to 60° C. is measured to be 186 seconds.

Therefore, it may be seen that the case of (a) of FIG. 4 is advantageous than the case of (b) of FIG. 4 to improve the heat transfer performance.

(a) of FIG. 5 shows a case where the volume of the heating container 10 is 200 L, the heat transfer method uses the side and bottom heating method, and the heat transfer area is 0.8 m². If the aspect ratio AR is 2.8 (i.e. the diameter D is 450 mm and the height H is 1,258 mm), water heated by the heater 20 installed on the lower side of the heating container 10 spreads relatively quickly to the center and upper portions of the heating container 10, and the time taken for water in the heating container 10 to reach from 10° C. to 60° C. is measured to be 165 seconds.

Meanwhile, (b) of FIG. 5 shows a case where the volume of the heating container 10 is 200 L, the heat transfer method uses the side and bottom heating method, and the heat transfer area is 0.8 m². If the aspect ratio AR is 9.4 (i.e. the diameter D is 300 mm and the height H is 2,829 mm), water heated by the heater 20 installed on the lower side of the heating container 10 spreads relatively slowly to the center and upper portions of the heating container 10, and the time taken for water in the heating container 10 to reach from 10° C. to 60° C. is measured to be 186 seconds.

Therefore, it may be seen that the case of (a) of FIG. 5 is advantageous than the case of (b) of FIG. 5 to improve the heat transfer performance.

In addition, as shown in FIGS. 4 to 5, when the volume of the heating container 10 is 200 L and the heat transfer area is 0.8 m², it may be seen that: (i) if the aspect ratio AR is 2.8, it is advantageous to improve the heat transfer performance in the case where the heat transfer method uses the side and bottom heating method than in the case where the heat transfer method uses the side heating method (that is, the case of (a) of FIG. 5 shows the heating time of 165 seconds, whereas the case of (a) of FIG. 4 shows the heating time of 178 seconds); and (ii) if the aspect ratio AR is 9.4, there is little difference in the heat transfer performance between the case where the heat transfer method uses the side and bottom heating method and the case where the heat transfer method uses the side heating method (that is, both the cases of (b) of FIG. 4 and (b) of FIG. 5 show the heating time of 186 seconds).

(a) of FIG. 6 shows a case where the volume of the heating container 10 is 200 L, the heat transfer method uses the side heating method, and the heat transfer area is 1.6 m². If the aspect ratio AR is 2.8 (i.e. the diameter D is 450 mm and the height H is 1,258 mm), water heated by the heater 20 installed on the lower side of the heating container 10 does not spread sufficiently to the center portion of the heating container 10, and the time taken for water in the heating container 10 to reach from 10° C. to 60° C. is measured to be 99 seconds.

Meanwhile, (b) of FIG. 6 shows a case where the volume of the heating container is 200 L, the heat transfer method uses the side heating method, and the heat transfer area is 1.6 m². If the aspect ratio AR is 9.4 (i.e. the diameter D is 300 mm and the height H is 2,829 mm), water heated by the heater 20 installed on the lower side of the heating container 10 spreads easily to the center portion of the heating container 10 but relatively slowly to the upper portion, and the time taken for water in the heating container 10 to reach from 10° C. to 60° C. is measured to be 91 seconds.

Therefore, it may be seen that the case of (b) of FIG. 6, in which the aspect ratio AR is relatively small and the heater 20 occupies a large portion of the side of the heating container 10, is advantageous than the case of (a) of FIG. 6 in which the aspect ratio AR is relatively high to improve the heat transfer performance.

In addition, the case of FIG. 6 shows the larger heat transfer area than the cases of FIGS. 4 and 5. Therefore, it may be seen that the heat transfer performance is measured higher in the case of FIG. 6 (that is, heating time in the case of FIG. 6 is shorter than each heating time in the cases of FIGS. 4 and 5).

(a) of FIG. 7 shows a case where the volume of the heating container 10 is 200 L, the heat transfer method uses the side and bottom heating method, and the heat transfer area is 1.6 m². If the aspect ratio AR is 2.8 (i.e. the diameter D is 450 mm and the height H is 1,258 mm), water heated by the heater 20 installed on the lower side of the heating container 10 spreads evenly and rapidly to the center and upper portions of the heating container 10, and the time taken for water in the heating container 10 to reach from 10° C. to 60° C. is measured to be 84 seconds.

Meanwhile, (b) of FIG. 7 shows a case where the volume of the heating container is 200 L, the heat transfer method uses the side and bottom heating method, and the heat transfer area is 1.6 m². If the aspect ratio AR is 9.4 (i.e. the diameter D is 300 mm and the height H is 2,829 mm), water heated by the heater 20 installed on the lower side of the heating container 10 spreads easily to the center portion of the heating container 10 but relatively slowly to the upper portion, and the time taken for water in the heating container 10 to reach from 10° C. to 60° C. is measured to be 91 seconds.

Therefore, it may be seen that the case of (a) of FIG. 7 is advantageous than the case (b) of FIG. 7 to improve the heat transfer performance. In addition, the case of FIG. 7 shows the larger heat transfer area than the cases of FIGS. 4 and 5. Therefore, it may be seen that the heat transfer performance is measured higher in the case of FIG. 7 (that is, heating time in the case of FIG. 7 is shorter than each heating time in the cases of FIGS. 4 and 5).

In addition, as shown in FIGS. 6 and 7, when the volume of the heating container 10 is 200 L and the heat transfer area is 1.6 m², it may be seen that: (i) if the aspect ratio AR is 2.8, it is advantageous to improve the heat transfer performance in the case where the heat transfer method uses the side and bottom heating method than in the case where the heat transfer method uses the side heating method (that is, the case of (a) of FIG. 7 shows the heating time of 84 seconds, whereas the case of (a) of FIG. 6 shows the heating time of 99 seconds); and (ii) if the aspect ratio AR is 9.4, there is little difference in the heat transfer performance between the case where the heat transfer method uses the side and bottom heating method and the case where the heat transfer method uses the side heating method (that is, both the cases of (b) of FIG. 7 and (b) of FIG. 7 show the heating time of 91 seconds).

When merging the contents described in the exemplary embodiments of FIGS. 4 to 7, it may be seen that there is the optimum ratio, which is the ratio at which the heat transfer performance is maximized among the aspect ratios ARs, based on the heat transfer method and the heat transfer area size. FIGS. 8 to 10 each show this point.

FIGS. 8 and 9 each show the heat transfer performance based on the heat transfer area and the aspect ratio AR; FIG.

10 shows the optimal ratio curve with respect to the heat transfer area; and in FIGS. 8 to 10, UA (kW/K) stands for the heat transfer performance, HEX Area (m²) stands for the heat transfer area, and AR (H/D) stands for the aspect ratio AR.

FIG. 8 shows the heat transfer performance when the volume of the heating container 10 is 200 L, the heat transfer method uses the side heating method, the heat transfer area ranges from 0.8 to 1.6 m², and the aspect ratio AR ranges from 2.5 to 10.0.

FIG. 9 shows the heat transfer performance when the volume of the heating container 10 is 200 L, the heat transfer method uses the side and bottom heating method, the heat transfer area ranges from 0.8 to 1.6 m², and the aspect ratio AR ranges from 2.5 to 10.0.

As shown in the graphs of FIGS. 8 and 9, it is possible to obtain the optimum ratio, i.e. the aspect ratio AR at which the heat transfer performance is maximized in the predetermined heat transfer method and heat transfer area size. FIG. 10 shows each optimum ratio based on the heat transfer areas of FIGS. 8 and 9.

(a) and (b) of FIG. 10 show that the optimum ratio has a value of 5.5 to 8.0 when the volume of the cylindrical heating container 10 is 200 L and the heat transfer area ranges from 0.8 to 1.6 m².

When considering each trend of the curves shown in (a) and (b) of FIG. 10 and the shape of the heating container, it may be seen that the optimum ratio has a value of 4.0 to 9.0 when the heat transfer area ranges from 0.6 to 1.8 m² based on the size and shape of the heating container 10.

As shown in (a) of FIG. 10, when the heat transfer method uses the side heating method, the optimum ratio curve in the heat transfer area may be expressed as a function having at least one inflection point.

As shown in (a) of FIG. 10, when the volume of the cylindrical heating container 10 is 200 L and the heat transfer method uses the side heating method, it may be seen that the optimum ratio has a value of around 6.0 when the heat transfer area ranges from 0.8 to 1.2 m², and has a value proportional to the heat transfer area when the heat transfer area is more than or equal to 1.2

If the curve shown in (a) of FIG. 10 is applied to a case where the volume of the heating container 10 ranges from 180 to 220 L, when the heat transfer method uses the side heating method, it may be seen that the optimum ratio has a value of 5.5 to 6.5 when the heat transfer area ranges from 0.8 to 1.2 m², and has a value proportional to the heat transfer area when the heat transfer area is more than or equal to 1.2 m².

As shown in (b) of FIG. 10, when the volume of the cylindrical heating container 10 is 200 L and the heat transfer method uses the side and bottom heating method, it may be seen that the optimum ratio has a value of around 5.0 when the heat transfer area ranges from 1.2 to 1.6 m², and has a value inversely proportional to the heat transfer area when the heat transfer area is less than or equal to 1.2 m².

If the curve shown in (b) of FIG. 10 is applied to a case where the volume of the heating container 10 ranges from 180 to 220 L, when the heat transfer method uses the side and bottom heating method, it may be seen that the optimum ratio has a value of around 4.5 to 5.5 when the heat transfer area ranges from 1.2 to 1.6 m², and has a value inversely proportional to the heat transfer area when the heat transfer area is less than or equal to 1.2 m².

The present disclosure may improve the heat transfer performance by optimizing the heat transfer method, the heat transfer area size and the aspect ratio AR, which are the main factors determining the heat transfer performance. In particular, the present disclosure has a technical feature in presenting the optimum ratio, that is, the aspect ratio AR at which the heat transfer performance is maximized in the predetermined heat transfer method and heat transfer area size.

The hot water supply tank according to the exemplary embodiments of the present disclosure has been described with reference to the accompanying drawings. However, the present disclosure is not limited to such embodiments, and it is apparent to those skilled in the art that the present disclosure may be variously modified and altered without departing from the spirit and scope of the present disclosure.

The invention claimed is:

1. A hot water supply tank comprising:
 a case forming an appearance of the hot water supply tank;
 a heating container accommodating a fluid and having an inner side treated with anticorrosive;
 a heater installed on at least a side of the heating container and transferring heat to the fluid, the heating container being configured to have a first ratio of a side height to a bottom diameter of the heating container to maximize a heat transfer performance of the heater, and the heating container including a heat transfer area occupied by the heater; and
 a heat insulator interposed between the case and the heater,
 wherein the first ratio of the heating container has a value inversely proportional to the heat transfer area when the heat transfer area is less than a first area,
 wherein the first ratio of the heating container has a value proportional to the heat transfer area when the heat transfer area is greater than or equal to the first area,
 wherein the first ratio has a value of 4 to 9 and the heat transfer area ranges from 0.6 to 1.8 m²,
 wherein in a case that a volume of the heating; container ranges from 180 to 220 L and the heater is installed only on the side of the heating container, the first has a value proportional to the heat transfer area when the heat transfer area is more than or equal to 1.2 m², and
 wherein in a case that the volume of the heating container ranges from 180 to 220 L and the heater is installed on a bottom as well as the side of the heating container, the first ratio has a value inversely proportional to the heat transfer area when the heat transfer area is less than or equal to 1.2 m².

2. The hot water supply tank of claim 1, wherein in the predetermined heat transfer area, the heat transfer performance corresponding to the first ratio is higher when the heater is installed on the bottom as well as side of the heating container than when the heater is installed only on the side of the heating container.

3. The hot water supply tank of claim 1, wherein the heat transfer performance corresponding to the first ratio is higher as the heat transfer area increases.

4. The hot water supply tank of claim 1, wherein the heater is a heat exchanger in which a refrigerant flows.

* * * * *